March 13, 1934. E. STEFFEN 1,950,460
PROCESS FOR THE CONVERSION OF OXYGEN CONTAINING CARBON SUBSTANCES
Filed June 13, 1930
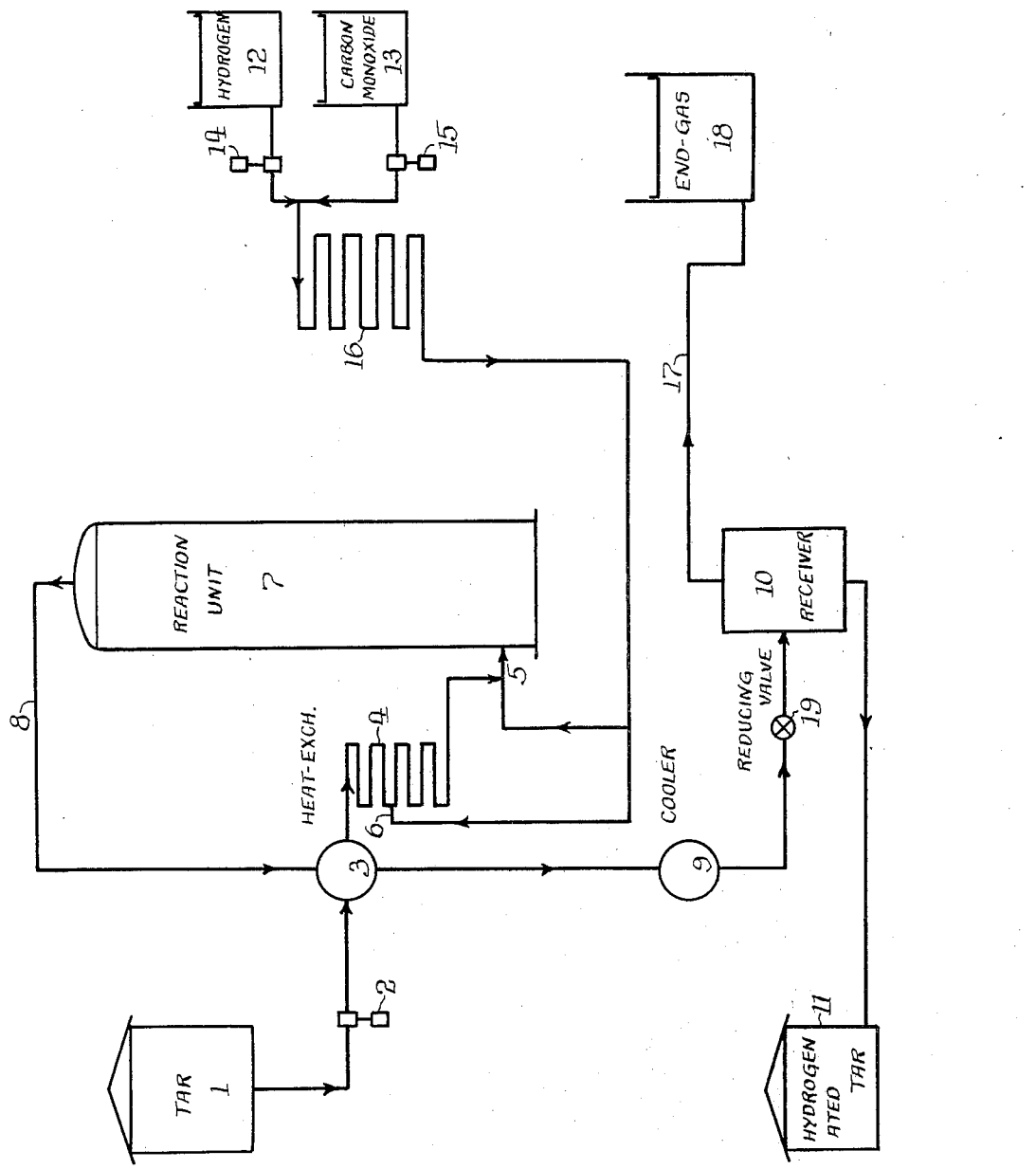
Inventor:
Erich Steffen,
By Wilkinson Huxley Byron & Knight
Atty's.

Patented Mar. 13, 1934

1,950,460

UNITED STATES PATENT OFFICE 1,950,460

PROCESS FOR THE CONVERSION OF OXYGEN CONTAINING CARBON SUBSTANCES

Erich Steffen, Duisburg-Meiderich, Germany

Application June 13, 1930, Serial No. 461,040
In Germany May 31, 1929

2 Claims. (Cl. 196—53)

In the conversion of oxygen containing carbon substances, such as carbon, tar, pitch, and other carbon containing substances, with the aid of heat and under considerable hydrogen pressure, the very undesirable condition develops during the treatment of the basic materials, that a large portion of the introduced hydrogen is lost for the actual reaction because it forms water with the oxygen of the basic product. The quantity of this reaction water under certain conditions is very considerable and amounts to approximately five to ten percent of the carbon containing substance used, whereby ten to twenty percent of the introduced valuable hydrogen of the actual reaction is withdrawn and applied for the development of water.

Also, owing to the water produced under the reaction conditions, the partial pressure of the hydrogen is very much reduced and therefore the reaction is unfavorably influenced. In addition to this undesirable condition and hindrance in reaction, the formation of water furthermore has the very considerable disadvantage that in the treatment of the reaction products due to their water content, great technical difficulties develop, the elimination of which represents considerable expense.

It has been discovered that during the conversion which takes place under high hydrogen pressure and under high temperature of oxygen containing carbon substances or bituminous materials, such as carbon, tars, pitch, mineral oil products, distilled products, and other carbon containing substances, the formation of reaction water from the hydrogen used can be decreased by means of carbon oxide (CO), the volume of carbon mon-oxide varying according to the basic material and to the reaction conditions.

The carbonic acid which develops during this reaction can be removed immediately in formation or during the reaction by the addition of carbonic acid absorption substances. Also other catalytic acting or inert substances which support the reaction can be added.

I have shown in the accompanying drawing, a diagrammatic layout of apparatus suitable for carrying out my improved method of operation. In the drawing, the coal, tar or mixture of coal and tar or other heavy hydrocarbon to be treated, leaves tank 1 and is raised to a suitable pressure by pump 2. The material under pressure is then passed through heat exchanger 3 where it is preheated by the products of the reaction which enter the heat exchanger through line 8 from the top of the reaction unit 7. Preheated material then enters the pipe still 4 where it is raised to the reaction temperature. The heated material is then mixed with the hot gas at the point 5 and enters the reaction unit 7. Some of the gas may be introduced into the material at the point 6 intermediate the lines of the pipe still 4.

The hydrogenation takes place in the reaction unit 7. After a suitable time in the reaction unit, which time depends on the temperature maintained and the type of reaction products desired, the gas and reaction products pass through pipe 8 to the heat exchanger 3, as above described. Further cooling and condensation are necessary and these are obtained in cooler 9, after which the pressure is reduced by the reducing valve 19, and the liquid and gaseous materials passed to the receiver 10. From the bottom of the receiver 10 the hydrogenated tar and liquid material is withdrawn and carried to the holder 11. From the top of the receiver 10 the gaseous products of the reaction are carried off to the gas holder 18. The amount of carbon monoxide which is necessary will be determined by the amount of oxygen compounds contained in the raw material. This gas is withdrawn from the hydrogen tank 12 through pump 14 and from the carbon monoxide tank 13 through pump 15. The compressed gas passes through the heater 16 where it is raised to a temperature approximating that of the reaction. From the heater it passes to the reaction unit, joining the material to be treated at point 5.

The following example of a splitting hydrogenation effect shows the considerable degree of effect by the addition of carbon oxide to the reaction hydrogen. The conditions for this reaction are the usual ones:

483.5 kg. of a paste, which consists of 345 kg. carbon and 138.5 kg. tar oil, are subjected to a hydrogen pressure of approximately 160 atmospheric pressure and under high temperature, approximately 460°. In addition to the required reaction products, 34.5 kg. of water are obtained.

If in the same apparatus, 483.5 kg. of paste of the same quality are heated to the same temperature and under a pressure of 160 atmospheres however by adding to the hydrogen approximately 20% of carbon monoxide, then in addition to the required reaction products only 5 kg. of water, namely only approximately 1/7 of the volume indicated above, will be obtained without the necessity of using pure hydrogen.

What I claim is:—

1. A process for the destructive hydrogenation of bituminous materials containing oxygen compounds at temperatures of approximately 460° and at pressures not less than approximately 160 atmospheres which comprises treating the materials in the presence of a hydrogenating gas containing approximately 20 per cent. carbon monoxide, the balance of the gas consisting mainly of free hydrogen, the oxygen contained in the oxygen compounds reacting to form carbon dioxide whereby the formation of water is materially reduced.

2. A process for the destructive hydrogenation of bituminous materials containing oxygen compounds at temperatures of approximately 460° and at pressures not less than approximately 160 atmospheres which comprises treating the materials in the presence of a hydrogenating gas containing approximately 20 per cent. carbon monoxide, the balance of the gas consisting mainly of free hydrogen, the oxygen contained in the oxygen compounds reacting to form carbon dioxide whereby the formation of water is materially reduced and causing the reaction to proceed in the presence of carbon dioxide absorbent materials to maintain the partial pressure of the carbon dioxide formed at a minimum.

ERICH STEFFEN.